United States Patent [19]

Dukes et al.

[11] 4,262,628

[45] Apr. 21, 1981

[54] ELECTROCOATING APPARATUS

[76] Inventors: Paul Dukes, 6693 Embassy Ct., Maumee, Ohio 43537; Paul Youngpeter, 5125 Trellis Way, Sylvania, Ohio 43560

[21] Appl. No.: 35,088

[22] Filed: May 1, 1979

[51] Int. Cl.³ .............................................. B05C 3/02
[52] U.S. Cl. ..................................... 118/425; 134/75; 134/83; 204/202
[58] Field of Search .................. 118/423, 425, 30; 134/75, 76, 83, 82, 127; 204/202, 203, 204; 198/342

[56] References Cited

U.S. PATENT DOCUMENTS

| | | | |
|---|---|---|---|
| 2,695,590 | 11/1954 | Zuercher | 198/342 X |
| 3,986,518 | 10/1976 | Sato | 118/425 X |

*Primary Examiner*—John P. McIntosh
*Attorney, Agent, or Firm*—Spencer & Kaye

[57] ABSTRACT

Apparatus for coating successive batches of workpieces with respectively different paints, composed of a plurality of coating tank units disposed along a conveying path and each arranged to hold a bath of a respective paint, a workpiece conveyor extending along such path for conveying workpieces therealong, a carriage movable along the conveying path to the region of a selected one of the tank units, and a conveyor guide structure carried by the carriage for controlling the movements of the conveyor in order to cause workpieces being conveyed by the conveyor to be immersed in the bath contained in the selected unit where the carriage is located.

6 Claims, 1 Drawing Figure

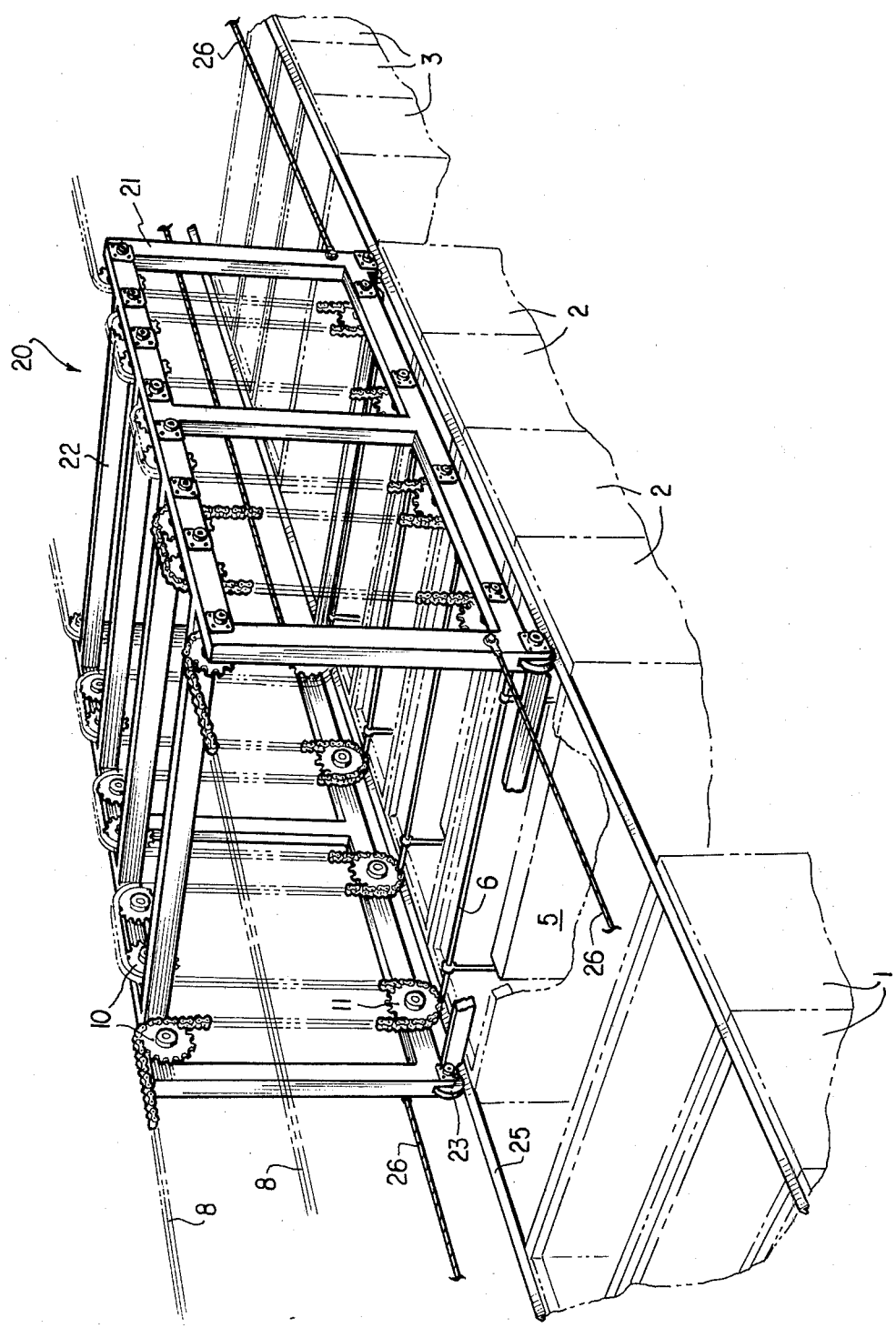

ELECTROCOATING APPARATUS

BACKGROUND OF THE INVENTION

The present invention relates to industrial electrocoating apparatus for applying a selected paint coating to workpieces conveyed in succession by a conveyor line.

Industrial finishing procedures generally include the basic operations of cleaning, electrocoating, rinsing and baking. The cleaning and electrocoating operations often involve immersion steps, while rinsing is typically effected by spray procedures.

In many finishing plants, it may be desirable to be able to apply any one of several different colors or paint types, although only a limited amount of floor space may be available. In such plants, it would be desirable to be able to switch from one color to another in a minimum of time.

Heretofore, this has been accomplished by disposing several electrocoating tank units adjacent the electrocoating line, with each unit being mounted on rollers.

When a change of color is desired, the electrocoating tank unit which is presently in the electrocoating line is rolled to one side of the line and the unit containing the desired paint is rolled into the line. Then, the necessary heater and voltage connections are made.

Such an arrangement presents a number of substantial drawbacks in that it ties up floor space alongside the coating line, and shuts down the electrocoating line for significant time periods while the heavy tank units are being exchanged.

SUMMARY OF THE INVENTION

It is a primary object of the present invention to provide the capability of electrocoating with any selected one of several colors using structurally simple apparatus and without requiring floor space adjacent the conveyor line.

Another object of the invention is to permit a selection of electrocoating colors to be provided on a single finishing line.

Further objects of the invention are to minimize waste of production materials and paint, and use of energy, and treatment chemicals, reduce air pollution, fire hazards and rejects, and simplify loading and unloading of the apparatus.

These and other objects are achieved according to the invention by the provision of apparatus for coating successive batches of workpieces with respectively different paints, which apparatus is composed of a plurality of coating tank units disposed along a conveying path and each arranged to hold a bath of a respective paint, workpiece conveyor means extending along such path for conveying workpieces therealong, carriage means movable along the conveying path to the region of a selected one of the tank units, and conveyor guide means carried by the carriage means for controlling the movements of the conveyor means in order to cause workpieces being conveyed by the conveyor means to be immersed in the bath contained in the selected unit where the carriage means are located.

In preferred embodiments of the invention, the workpiece conveyor means are composed of a pair of laterally spaced conveyor chains and a plurality of workpiece-supporting hangers, each extending between, and supported by, the chains, and each arranged to support at least one workpiece, and the apparatus further includes rails located above the tank units and extending along the conveying path, the carriage means being provided with supporting wheels mounted to travel along the rails.

In particular preferred embodiments of the invention, the conveyor guide means are constituted by two sets of sprocket wheels, with the wheels of each set engaging a respective one of the chains for causing the chains, in the region of the carriage means, to undergo a vertical displacement which effects such immersion of workpieces in the bath contained in the selected unit where the carriage means are located. Preferably, the apparatus is provided with carriage displacement means connected to the carriage means for moving the carriage means along the conveying path independently of movements of the workpiece conveyor means.

In one practical system with which the invention is practiced, at least one coating tank unit is composed of a plurality of individual coating tanks disposed adjacent one another along the conveying path and each arranged to hold a respective bath of paint, and the conveyor guide means are arranged to immerse workpieces in the bath in each tank of the one tank unit when the carriage means are located in the region of the one tank unit. In most cases each tank unit will have such a form.

Thus, by mounting the conveyor guide elements on a movable carriage and arranging the coating tank units in a line along the conveying path, the need for floor space at the sides of the conveyor line is eliminated and change-over from one paint type or color to another can be effected more easily and rapidly, given the lighter weight and higher mobility of the carriage compared to the coating tank units.

BRIEF DESCRIPTION OF THE DRAWING

The FIGURE is a perspective view of one preferred embodiment of apparatus according to the invention.

DESCRIPTION OF THE PREFERRED EMBODIMENTS

The FIGURE illustrates a portion of an electrocoating system constructed according to the invention, including a first set of tanks 1 for applying paint of a first color, a second set of tanks 2 for applying paint of a second color, and a third set of tanks 3 for applying paint of a third color. These can be followed in line by further sets of tanks for further paint colors, followed by baking apparatus. In each set of tanks 1, 2 and 3, the first tank will normally contain a paint bath and cathode or anode means for establishing an electrostatic field between the tank walls and workpieces 5. The second tank can also be arranged to hold a bath of the same paint and be identical to the first tank, or the second and all subsequent tanks of the group can be equipped with spray rinse apparatus for rinsing excess paint from the workpieces 5.

Workpieces 5 are conveyed by a bar machine, which is so-called because the workpieces are suspended from bars, or hangers, 6 carried between two parallel, laterally spaced chains 8. In most systems, hangers 6 will be spaced at regular intervals along the length of chains 8.

Above tanks 2, each chain 8 is guided around a respective succession of sprocket wheels 10 and 11. Upper wheels 10 are located at a higher elevation than lower wheels 11 and each chain 8 passes over its associated wheels 10 and under its associated wheels 11. Along the length of each chain 8, respective upper wheels 10 are disposed at the upstream end and the downstream end of the conveyor path portion associated with tanks 2 and two wheels 10 are interposed between each succeeding pair of wheels 11. The distance between the axes of successive wheels 11 is equal to the on-center distance between successive tanks 2 and the axis of each lower wheel 11 is aligned with the transverse median plane of a respective one of tanks 2.

Hangers 6 supporting workpieces 5 are first conveyed by chains 8 through a cleaning station (not shown) where they are cleaned in a known manner. The hangers then pass tanks 1, so that workpieces 5 pass over those tanks, and thereafter the hangers 6 pass around the first upper wheels 10 and descend to the first lower wheels 11, causing workpieces 5 to descend into the first tank 2 where they are immersed in paint and an electrostatic field is established between the tank walls and the workpieces. The hangers 6 then pass upwardly around the next pair of upper wheels 10, which are located and spaced apart in a manner to assure that workpieces 5 will clear the laterally extending boundary wall between the first two tanks 2, and down around the succeeding lower wheel 11, immersing the workpieces 5 in the second tank 2.

This travel continues until the hangers pass around the last upper wheels 10, whereupon chains 8 carry the workpieces over tanks 3 to rinsing and baking units.

In order to enable different batches of workpieces to be painted with different colors, sprocket wheels 10 and 11 are, according to the invention, mounted on a movable carriage 20 composed of vertical frame sides 21 extending along the conveying path and cross bars 22 connecting sides 21 together. Carriage 20 is mounted on wheels 23 arranged to travel along rails 25 to shift carriage 20 between groups of tanks 1, 2 and 3.

After a batch of workpieces has been coated in tanks 2, it is only necessary to move carriage 20 along rails 25, by pulling on cables 26, until the frame is in position over tanks 1 or tanks 3. An electrocoating operation can then be performed on a subsequent batch of workpieces in the manner described above.

During travel of the carriage from one group of tanks to the other, chains 8 can be fixed against longitudinal travel, which offers the advantage of eliminating the need to synchronize chain movement and carriage movement and which can be easily done when no workpieces are being carried in the vicinity of the carriage. Alternatively, the chains can first be advanced until all hangers are at their uppermost position and the carriage can then be displaced in unison with the chains.

Thus, the carriage according to the invention makes it possible to provide tanks holding different paints in line in an electrocoating installation and permits changeover from one paint to another in an absolute minimum of time and with a minimum effort.

It will be understood that the above description of the present invention is susceptible to various modifications, changes and adaptations, and the same are intended to be comprehended within the meaning and range of equivalents of the appended claims.

What is claimed is:

1. Apparatus for coating successive batches of workpieces with respectively different paints, comprising: a plurality of coating tank units disposed along a conveying path and each arranged to hold a bath of a respective paint, with at least one said unit being composed of a plurality of individual tanks succeeding one another along the conveying path; workpiece conveyor means extending along such path for conveying workpieces therealong; carriage means movable along said conveying path to the region of a selected one of said tank units; and conveyor guide means carried by said carriage means and operatively associated with said conveyor means for causing workpieces being conveyed by said conveyor means to be introduced into each said individual tank of said at least one unit in succession while said carriage means are maintained stationary above said tanks of said at least one unit.

2. An arrangement as defined in claim 1 wherein said workpiece conveyor means comprise a pair of laterally spaced conveyor chains extending in parallel along the entire length of said conveying path and a plurality of workpiece-supporting hangers, each extending between, and supported by, said chains, and each arranged to support at least one workpiece.

3. An arrangement as defined in claim 2 further comprising rail means located above said tank units and extending along the conveying path, and wherein said carriage means comprise supporting wheel means mounted to travel along said rail means.

4. An arrangement as defined in claim 2 wherein said conveyor guide means comprise two sets of sprocket wheels, with the wheels of each said set engaging a respective one of said chains for causing said chains, in the region of said carriage means, to undergo a succession of vertical displacements which effects such introduction of workpieces into said tanks of said at least one unit when said carriage means are located thereat.

5. An arrangement as defined in claim 4 wherein said conveyor guide means are further arranged for maintaining said chains at an elevation where workpieces are maintained above the tanks outside of the region occupied by said carriage means.

6. An arrangement as defined in claim 1 further comprising carriage displacement means connected to said carriage means for moving said carriage means along said conveying path independently of movements of said workpiece conveyor means.

* * * * *